United States Patent [19]

Vauvelle et al.

[11] Patent Number: 4,763,860
[45] Date of Patent: Aug. 16, 1988

[54] COCKPIT PROVIDED WITH A LATERAL CONTROL STICK ADAPTED TO BE ACTUATED ONE-HANDED AND SEAT FOR SUCH A COCKPIT

[75] Inventors: Bernard Vauvelle, Leguevin; Hubert Chancholle, Blagnac, both of France

[73] Assignee: Societe Nationale Industrielle et Aerospatiale, Paris, France

[21] Appl. No.: 60,155

[22] Filed: Jun. 10, 1987

Related U.S. Application Data

[63] Continuation of Ser. No. 817,556, Jan. 10, 1986, abandoned.

[30] Foreign Application Priority Data

Jan. 18, 1985 [FR] France .................................. 85 00737

[51] Int. Cl.⁴ ............................................. B64D 11/06
[52] U.S. Cl. ............................... 244/122 R; 244/118.5
[58] Field of Search ............... 244/122 R, 234, 118.5; 297/115, 161, 411, 417

[56] References Cited

U.S. PATENT DOCUMENTS

| | | | |
|---|---|---|---|
| 2,249,849 | 7/1941 | Owler | 297/115 |
| 2,452,183 | 10/1948 | Clawson | 297/161 |
| 2,618,447 | 11/1952 | Lecarme | 244/234 |
| 2,710,047 | 6/1955 | Duppstadt | 244/122 R |
| 2,902,085 | 9/1959 | Bahnson, Sr. | 297/115 |
| 3,568,972 | 3/1971 | Sherman | 248/419 |
| 4,012,014 | 3/1977 | Marshall | 244/234 |
| 4,097,088 | 6/1978 | Meiller | 297/115 |
| 4,400,033 | 8/1983 | Pietsch | 297/115 |

Primary Examiner—Galen L. Barefoot
Assistant Examiner—Rodney Corl
Attorney, Agent, or Firm—Fisher, Christen & Sabol

[57] ABSTRACT

This invention relates to a cockpit comprising a seat with armrest, as well as a mechanical control member of the control stick type adapted to be actuated by one hand and mounted at a fixed location in said cockpit at least substantially in forward extension of an armrest of said seat, the position of said seat being adjustable with respect to said mechanical control member. According to the invention, at least a part of said armrest is articulated about a transverse pin connected to said seat, in order to be able to occupy a plurality of fixed positions of different inclinations about said pin, converging towards said mechanical control member and adjustable thanks to control means. The invention is more particularly applicable to the piloting of aircraft.

8 Claims, 4 Drawing Sheets

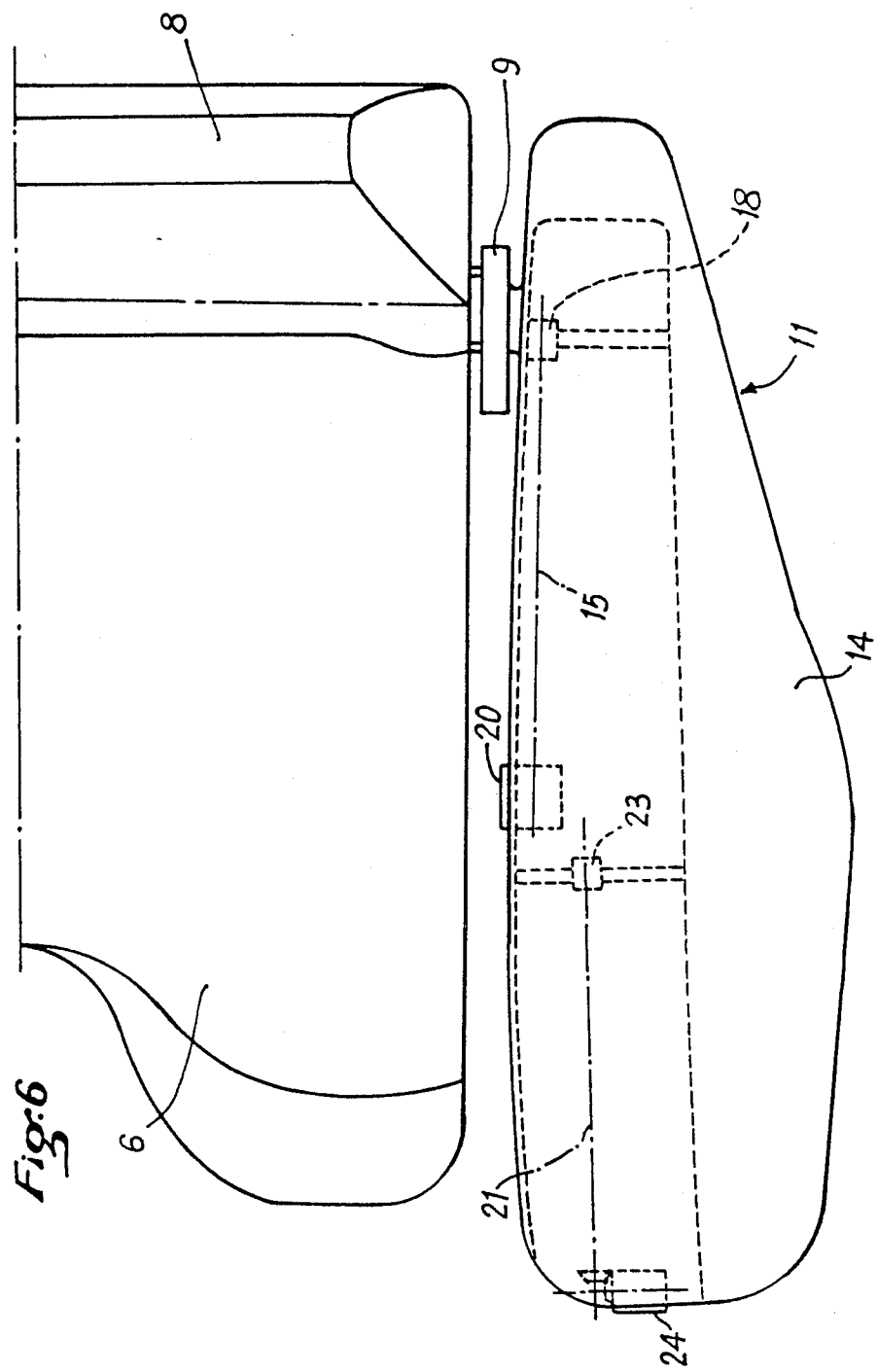

COCKPIT PROVIDED WITH A LATERAL CONTROL STICK ADAPTED TO BE ACTUATED ONE-HANDED AND SEAT FOR SUCH A COCKPIT

This is a continuation of application Ser. No. 817,556 filed Jan. 10, 1986, now abandoned.

The present invention relates to a cockpit for craft, particularly for aircraft, provided with a mechanical control member of the control stick type, disposed laterally with respect to the pilot and adapted to be actuated one-handed by the pilot; the invention also relates to a seat for such a cockpit.

For piloting aircraft, such a mechanical control member is already known, fixedly mounted on board the craft at least substantially in forward extension of an armrest of the pilot's seat. This mechanical control member is capable of pivoting, with limited amplitudes, parallel to two axes:

On the one hand, the longitudinal axis of the aircraft, in order to ensure control in pitch;

On the other hand, the transverse axis of the aircraft, in order to ensure control in roll.

These two pivoting movements, possibly made simultaneously, are effected by the pilot's hand, in a lateral displacement associated with a twist of the wrist or in a longitudinal displacement by bending of the wrist associated with very slight movements of the fore-arm.

All these movements are precise and must represent the pilot's will to control with precision the path of the aircraft, whatever the surrounding conditions, even if they are unfavourable, such as a strong outside disturbance, storm, transitory load factors, etc. . . . Consequently, in manual piloting phase, it is indispensable that the pilot's forearm be supported, maintained in position, whilst leaving his hand completely free to move.

It is for this reason that, in a cockpit provided with such a mechanical control member, a fixed arm-rest, fast with the lateral instrument panel of said cockpit and aligned with said member, is provided.

Furthermore, the seat on which the pilot (or co-pilot) sits must be adjustable in position and/or in height in order to be adaptable to all existing human morphologies as well as to the flight phase underway. In fact, it is known that, depending on the flight configuration (take-off, landing, cruising, engagement of automatic pilot, etc. . . . ), the pilot must be able to advance or move back his seat. It will be readily understood for example that, in manual piloting phase, the seat must be advanced for the pilot to have all the control members rapidly at his disposal, whilst, in automatic piloting phase, the seat may be moved back in order to offer the pilot greater comfort, since in that case his role is limited to watching over the flight parameters.

However, this necessary mobility of the pilot's seat is in contradiction with the armrest associated with the lateral control member, since this armrest is fixed: consequently, this lateral armrest imposes a precise position on the pilot, as well as on his seat and even on the backrest of this seat. Consequently, the lateral one-handed control member, whose particular purpose is to facilitate piloting and to improve the pilot's comfort when working, compared with the conventional two-handed central control sticks, actually leads to reducing the pilot's comfort due to the fixed position of the seat which it imposes.

Moreover, the pilot's seat is usually an armchair provided with an armrest. Consequently, the seat's armrest disposed to the side of the fixed lateral armrest associated with the control member not only duplicates the function of the latter, but, by its bulky nature, also obliges the fixed armrest and the control member to be offset laterally more than is necessary. In addition, it may hinder the pilot during piloting.

It is an object of the present invention to overcome these drawbacks and to propose an armrest for assisting the piloting of craft, and in particular aircraft, provided with a one-handed lateral control member, in order to increase precision of piloting. It is another object of the invention to reduce the pilot's fatigue by increasing his comfort during manual piloting and when he is monitoring the flight parameters.

The invention also enables a seat to be produced, adapted to any morphology of the pilot.

To this end, according to the invention, the cockpit comprising a seat with armrest, as well as a mechanical control member of the control stick type adapted to be actuated by one hand and mounted at a fixed location in said cockpit at least substantially in forward extension of an armrest of said seat, the position of said seat being adjustable with respect to said mechanical control member, is noteworthy in that at least a part of said armrest is articulated about a transverse pin connected to said seat, in order to be able to occupy a plurality of fixed positions of different inclinations about said pin, converging towards said mechanical control member and adjustable thanks to control means.

According to the invention, the armrest of the seat disposed on the side of said mechanical control member, thanks to its adjustments, may thus perform the function of fixed lateral armrest associated with the control member without presenting the drawbacks thereof.

It will be noted that, by the pilot sliding his forearm relatively to the armrest, each position of adjustment of the armrest allows a certain latitude in the position of the pilot's seat with respect to the mechanical control member. In any case, for each relative position of this seat with respect to said mechanical control member, it is easy to adjust the inclination of the armrest if it is provided to mount the or each member for manoeuvring said control means on said armrest so as to be accessible to the corresponding hand. The invention therefore allows:

displacement of the seat or only of the backrest, for example as a function of the mode of piloting;
adaptation to the pilot's morphology;
slight lateral displacements of the forearm;
the arrangement of the control member in exact extension of said armrest, without being outwardly offset with respect thereto.

The fixed lateral armrest specifically associated with the control member may therefore be eliminated.

In the usual case of the seat being provided with a backrest whose position is adjustable, said pivot pin is advantageously connected to the support part of said seat and not to the backrest, so as to be able to adjust said backrest without having to modify the position of said armrest.

In a particularly simple embodiment, said armrest is in one piece and is articulated on the seat by its rear part.

According to a variant embodiment, said armrest is in at least two parts articulated one on the other about a transverse pin, the rear part of said armrest being connected to said seat. In that case, said rear part of the armrest may be connected rigidly to the seat. However, in order to be able to obtain an adjustment in height, in addition to the adjustment in inclination furnished by the articulation between said parts, said rear part of the armrest is preferably connected to the seat in articulated manner about a transverse pin. Whatever the mode of connection of the rear part of the armrest on the seat, the front part thereof advantageously supports a rigid support table extending rearwardly above said rear part. This rigid table thus offers continuous support, without structural break, for the pilot's forearm.

The means for controlling the armrest according to the invention may be of any known type, for example of the linkage or threaded pin type. They are preferably such that they allow the armrest to be totally raised, without loss of the adjustment existing at the moment of such lift. It is also advantageous if their structure allows adjustment of the armrest by electrical control or the like.

The invention will be more readily understood on reading the following description with reference to the accompanying drawings, in which:

FIG. 6 is a schematic partial plan view corresponding to FIG. 5, the armrest being in a different position.

Figure 1:
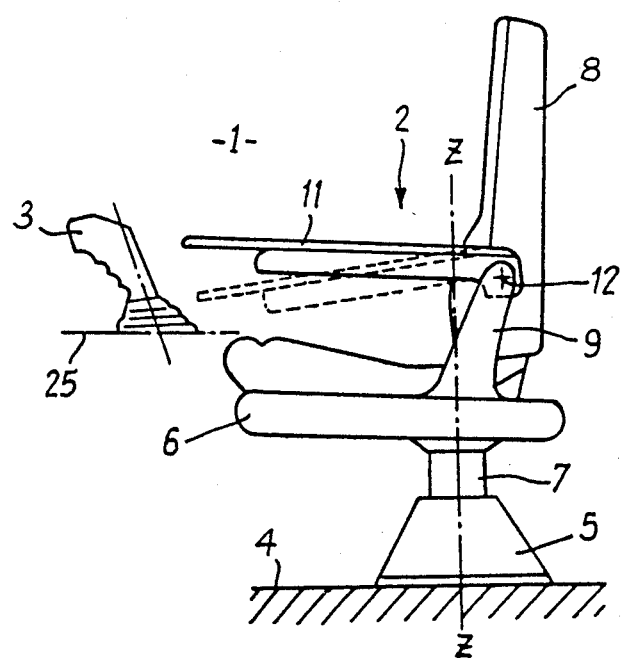
FIG. 1 is a schematic view in side elevation of a first embodiment of the invention.

Referring now to the drawings, FIGS. 1 to 4 partially show an aircraft cockpit 1, comprising a seat 2, as well as a mechanical control member 3 of the control stick type, adapted to be actuated by one hand and fixedly mounted on a lateral console 25 in said cockpit.

The seat 2 is mounted on the floor 4 of the cockpit 1 by means of a known system of fixation 5 allowing the position of said seat to be adjusted with respect to the controls (not shown) of the aircraft, parallel to two directions X—X and Y—Y at right angles to each other and respectively parallel to the longitudinal axis and to the transverse axis of the aircraft.

The pilot may thus easily find his horizontal distances with respect to said controls.

Moreover, the seat part 6 of seat 2 may be adjusted in height thanks to a system 7 of known type allowing adjustment of the position of said seat 6 in direction Z—Z at right angles to directions X—X and Y—Y.

At the rear, i.e. towards backrest 8, the seat part 6 of seat 2 comprises two upwardly directed, parallel supports 9 on which are fixed two armrests 10 and 11.

One of these two armrests, the one referenced 10, is of any known type and is connected to seat 2 by any known means.

On the other hand, the other armrest 11, disposed just opposite the mechanical control member 3, presents a structure and/or a fixation according to the invention.

Figure 2:
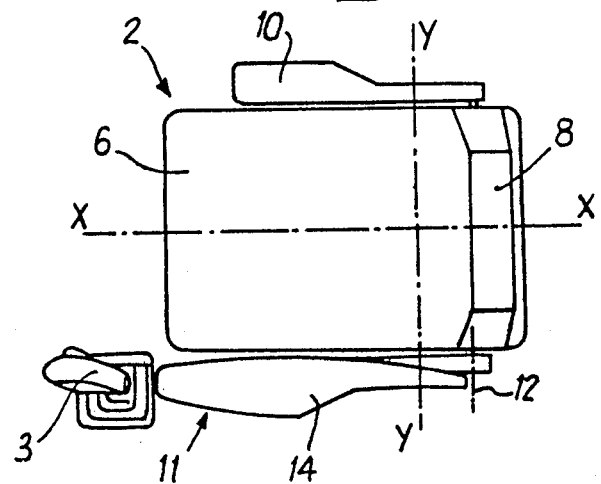
FIG. 2 is a plan view corresponding to FIG. 1.

In the embodiment of FIGS. 1 and 2, the armrest 11 is in one piece and is articulated by its rear end on the corresponding support 9, about a transverse pin 12, so as to be able to occupy a plurality of adjustable fixed positions of different inclinations. FIG. 1 illustrates one position in solid lines and one position in broken lines.

Figure 3:
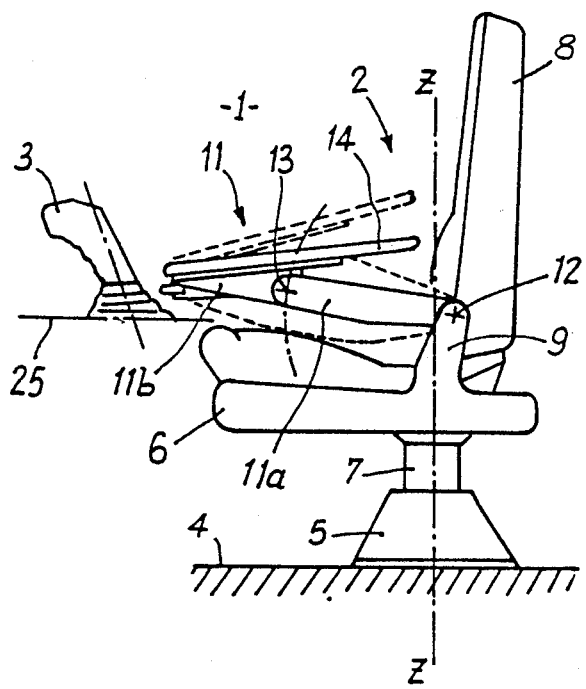
FIG. 3 is a schematic view in side elevation of a second embodiment of the invention.
Figure 4:
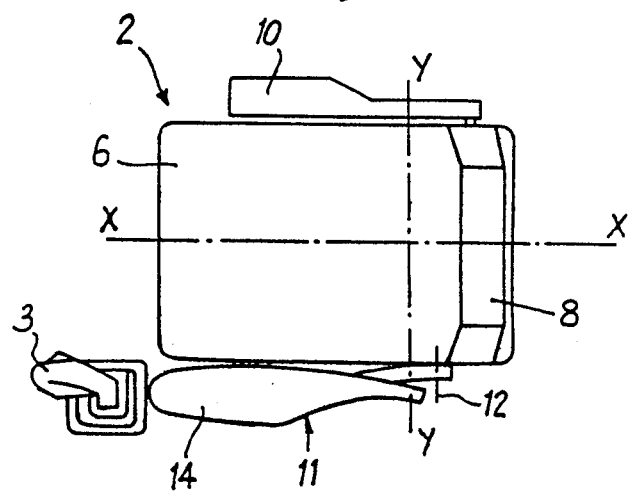
FIG. 4 is a plan view corresponding to FIG. 3.

In the embodiment of FIGS. 3 and 4, the armrest 11 comprises a rear part 11a and a front part 11b. The rear part 11a is articulated, by its rear end, on the corresponding support 9 about transverse pin 12, as described hereinabove. The front part 11b is articulated, by its rear end, on the front end of the rear part 11a, about a transverse pin 13, so as to be able to occupy a plurality of adjustable fixed positions of different inclinations with respect to the rear part 11a. In this way, in the embodiment of FIGS. 3 and 4, it is possible to adjust not only the inclination of the rear part 11a with respect to seat 6, but also the inclination of the front part 11b with respect to the rear part 11a. A rigid support table 14 is fast with the front part 11b and extends the latter above the rear part 11a. Adjustment of the inclination of rear part 11a thus allows adjustment in height of the support table 14, whilst adjustment of the inclination of the front part 11b allows adjustment in inclination of said table 14. FIG. 3 shows two positions in broken lines, in addition to the position in solid lines, for armrest 11.

Figure 5:
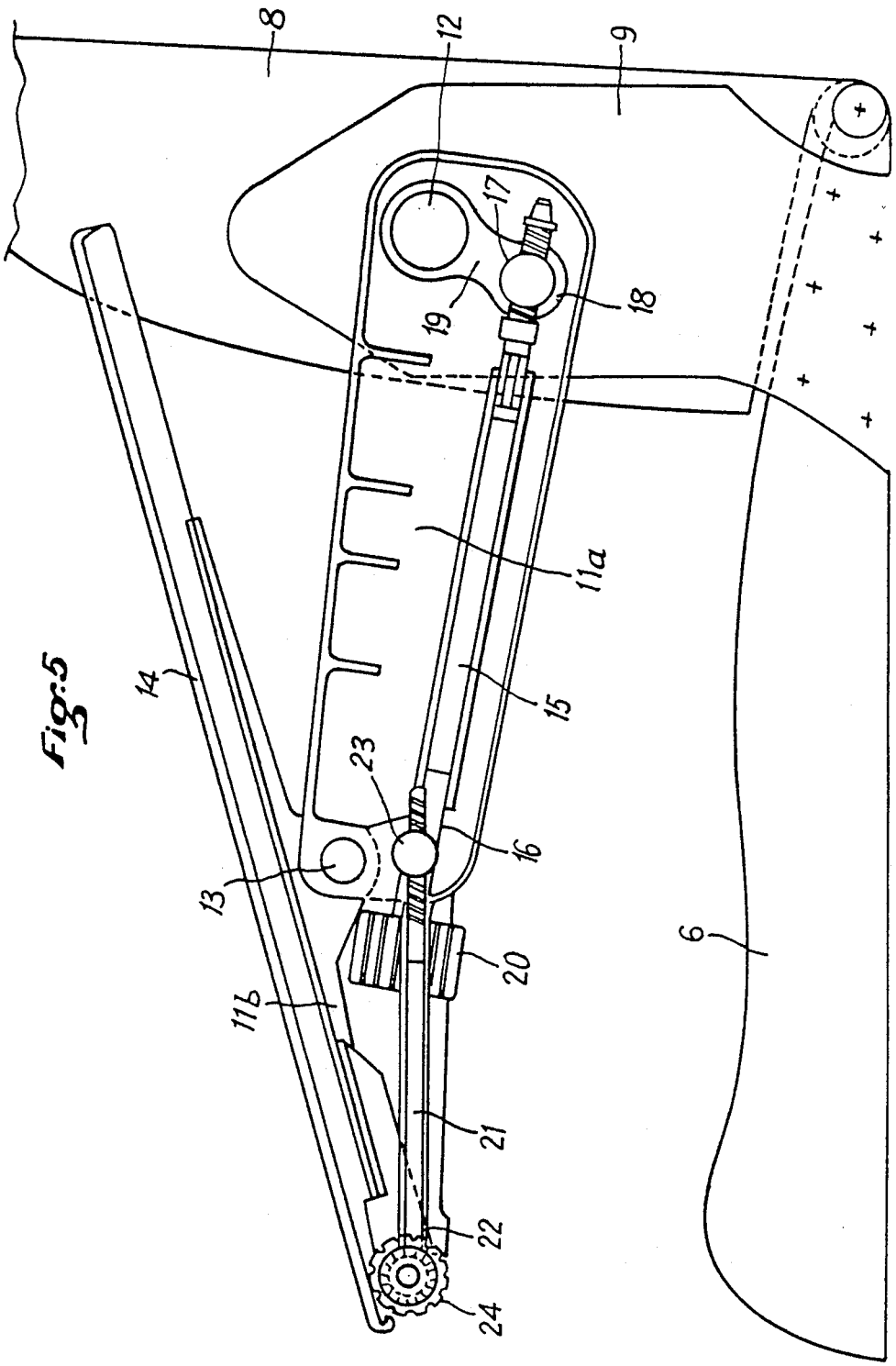
FIG. 5 is a schematic side view, on a larger scale and with parts torn away, illustrating the mechanism of the embodiment of FIGS. 3 and 4.

The control means used for adjusting the position of the armrests 11 of FIGS. 1 to 4 may be of any appropriate type. FIGS. 5 and 6 show an embodiment of such control means, more particularly appropriate for the armrest of FIGS. 3 and 4.

As may be seen in FIG. 5, for adjusting the inclination of the rear part 11a with respect to seat 6, there is provided a spindle 15 swivelling, whilst being axially blocked, in a smooth bearing 16 fast with said rear part 11a and engaged by a threaded part in a threaded plug element 17 adapted to rotate in the eccentric end 18 of a tab 19 mounted to rotate about pin 12.

Spindle 15 is controlled in rotation by a knurl 20, accessible on the inner side of the armrest 11 (cf. FIG. 6).

Furthermore, for adjusting the inclination of the front part 11b with respect to the rear part 11a, a spindle 21 is provided, swivelling, whilst being axially blocked, in a smooth bearing 22 fast with said front part 11b and engaged by a threaded part in a threaded plug element 23 mounted to rotate in the rear part 11a, in eccentric manner with respect to the pivot pin 13. Spindle 21 is controlled in rotation by a knurl 24 accessible on the inner side of the armrest (cf. FIG. 6).

FIG. 5 illustrates the armrest 11 for a forwardly and downwardly inclined position of the support table 14, whilst in FIG. 6, the position of this table is assumed to be at least substantially horizontal.

When the whole armrest 11 is raised by pivoting about pin 12, the control means 15 to 24 maintain the relative position that an already existing adjustment imposed on parts 11a and 11b of the armrest 11. In this way, when this armrest 11 is folded down again into position of use, it is not necessary to proceed with a fresh adjustment, insofar as the relative position of seat 2 with respect to the controls of the aircraft has not been modified or only slightly modified. In any case, adjustment of the height (knurl 20) and/or of the inclination (knurl 24) of the armrest 11 may easily be completed, at any instant, by actuating said knurls 20 and 24 by the hand controlling the mechanical control member 3.

What is claimed is:

1. A cockpit having a seat with armrest, as well as a mechanical control member of the control stick type adapted to be actuated by one hand and disposed at least substantially in forward extension of an armrest of said seat, comprising:

(a) a rear part of an armrest having a first spindle threadably received in a first plug element mounted on a seat back, said first spindle having a first means for rotating the first spindle in and out of the first plug element, whereby said rear part is inclinable in relation to the seat back;

(b) a forward part of an armrest having a second spindle threadably received in a second plug element mounted on said rear part, said second spindle having a second means for rotating the second spindle in and out of the second plug element, whereby said forward part is inclinable in relation to the rear part, and whereby an armrest is provided which is doubly adjustable with respect to a seat.

2. The apparatus of claim 1 where the rear part further comprises a first pivot pin mounted on the seat back and a tab rotatably mounted on the first pivot pin, wherein said first plug element is rotatably mounted on said tab.

3. The apparatus of claim 2 where the forward part further comprises an arm support table attached to said forward part, said rear part further comprising a second pivot pin, wherein said arm support table is pivotally mounted on sadi seocnd pivot pin, whereby adjustment of the first means for rotating adjusts the height of the arm support table and adjustment of the second means for rotating adjusts the angle of inclination of the arm support table.

4. The apparatus of claim 3 wherein the first and second means for rotation are accessible on an inner side of the rear and forward parts.

5. A cockpit having a seat with an armrest, as well as a mechanical control member of the control stick type adapted to be actuated by one hand and disposed at least substantially in forward extension of the armrest, comprising:

(a) an armrest pivotally mounted on a seat;
(b) a first rotatable spindle threadably mounted on said armrest for adjusting heights of the armrest, wherein the first spindle is mounted on a rear part of the armrest;
(c) a second rotatable spindle threadably mounted on the armrest for adjusting angles of inclination of the armrest, wherein the second spindle is mounted on a forward part of the armrest;
(d) an arm support table connected to a forward part of said arm rest, wherein said arm support table is pivotally mounted to a rear part of said armrest, whereby rotation of said first rotatable spindle adjusts for height of the arm support table, and whereby rotation of said second rotatable spindle adjusts for angle of inclination of said arm support table;
(e) a first pivot pin mounted on the seat, a tab rotatably mounted on said first pivot pin and a first rotatable plug element mounted on said tab, wherein said rear part is pivotally mounted on said first pivot pin, wherein said first rotatable spindle is threadably received by said first rotatable plug element, and whereby rotation of the first rotatable spindle changes angles of inclination of the rear part.

6. The apparatus of claim 5 further comprising a second pivot pin mounted on said rear part, a second rotatable plug element mounted on said rear part, wherein said arm support table is pivotally mounted on said second pivot pin, and wherein said second rotatable spindle is threadably received by said second plug element.

7. The apparatus of claim 6 further comprising first and second means for rotating the first and second rotatable spindles.

8. The apparatus of claim 7 wherein the first and second means for rotating are accessible on an inner side of the armrest.

* * * * *